United States Patent
Lee et al.

(10) Patent No.: US 9,952,842 B2
(45) Date of Patent: Apr. 24, 2018

(54) COMPILER FOR ELIMINATING TARGET VARIABLES TO BE PROCESSED BY THE PRE-PROCESSING CORE

(71) Applicant: Samsung Electronics Co., Ltd., Gyeonggi-do (KR)

(72) Inventors: In-Ho Lee, Gyeonggi-do (KR); I Saac Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/962,850

(22) Filed: Dec. 8, 2015

(65) Prior Publication Data
US 2016/0179490 A1 Jun. 23, 2016

(30) Foreign Application Priority Data
Dec. 18, 2014 (KR) .......................... 10-2014-0183062

(51) Int. Cl.
*G06F 9/45* (2006.01)
*G06T 1/20* (2006.01)

(52) U.S. Cl.
CPC .............. *G06F 8/447* (2013.01); *G06F 8/425* (2013.01); *G06F 8/436* (2013.01); *G06F 8/443* (2013.01); *G06T 1/20* (2013.01)

(58) Field of Classification Search
CPC ... G06F 8/41; G06F 8/52; G06F 8/443; G06F 8/436
USPC .......................... 717/140, 146, 151, 142, 143
See application file for complete search history.

(56) References Cited

U.S. PATENT DOCUMENTS

| 7,426,724 | B2 | 9/2008 | Kilgard et al. |
| 7,528,843 | B1* | 5/2009 | Kilgard ................. G06T 15/005 345/421 |
| 7,624,449 | B1* | 11/2009 | Perriot .................. G06F 21/563 726/22 |
| 8,134,570 | B1 | 3/2012 | Duluk, Jr. et al. |
| 8,207,975 | B1 | 6/2012 | Molnar et al. |
| 8,325,184 | B2 | 12/2012 | Jiao et al. |
| 8,355,028 | B2 | 1/2013 | Jiao et al. |
| 8,624,894 | B2 | 1/2014 | Son et al. |

(Continued)

FOREIGN PATENT DOCUMENTS

| KR | 1020090077432 | 7/2009 |
| KR | 10-1008809 | 1/2011 |

OTHER PUBLICATIONS

Perryman, "Runtime Compilation with NVIDIA Cuda as a Programming Tool", 2012.*

(Continued)

*Primary Examiner* — Phillip H Nguyen
(74) *Attorney, Agent, or Firm* — The Farrell Law Firm, P.C.

(57) ABSTRACT

A computer system for compiling a source program into an object program includes a graphics processor having a pre-processing core and a post-processing core, and a processor configured to execute a compiler to convert the source program into an intermediate program including a target variable to be processed by the pre-processing core, generate a modified-intermediate program from the intermediate program by eliminating the target variable among variables included in the intermediate program and convert the modified-intermediate program into the object program including the target variable to be processed by the post-processing core.

20 Claims, 15 Drawing Sheets

(56) References Cited

U.S. PATENT DOCUMENTS

| | | | |
|---|---|---|---|
| 9,361,119 B1* | 6/2016 | Lin | G06F 9/4401 |
| 2002/0095669 A1* | 7/2002 | Archambault | G06F 8/4435 |
| | | | 717/157 |
| 2004/0207622 A1* | 10/2004 | Deering | G06T 15/50 |
| | | | 345/426 |
| 2004/0237074 A1* | 11/2004 | Aronson | G06F 8/4434 |
| | | | 717/158 |
| 2008/0033987 A1* | 2/2008 | Carter | G06F 17/30958 |
| 2008/0136817 A1* | 6/2008 | Dederichs | G06T 15/00 |
| | | | 345/426 |
| 2008/0189524 A1 | 8/2008 | Poon et al. | |
| 2010/0033483 A1* | 2/2010 | Stewart | G06T 15/005 |
| | | | 345/426 |
| 2012/0223946 A1 | 9/2012 | Nystad et al. | |
| 2012/0223947 A1 | 9/2012 | Nystad et al. | |
| 2013/0159982 A1* | 6/2013 | Lerios | G06F 8/423 |
| | | | 717/146 |
| 2013/0219378 A1 | 8/2013 | Glaister et al. | |
| 2014/0149969 A1* | 5/2014 | Brower | G06F 8/423 |
| | | | 717/140 |

OTHER PUBLICATIONS

Akopian, Graphics Performance Benchmarking of Android Devices Using OpenGL ES , 2015.*
Kessenich et al., "The OpenGL Shading Language", 2010.*

* cited by examiner

FIG. 7A

```
attribute vec4 vertexIn;
attribute vec3 colorIn;

uniform lowp float fColor;
uniform highp mat4 mvp;

varying lowp vec4 color;
varying lowp vec4 fogColor;

void main()
{
    gl_Position = mvp * vertexIn;
    color = vec4(colorIn, 1.0);
    fogColor = vec4(vec3(fColor), 0.0);
}
```
~ VTX(1)

FIG. 7B

```
attribute vec4 vertexIn;
attribute vec3 colorIn;

uniform lowp float fColor;
uniform highp mat4 mvp;

varying lowp vec4 color;

void main()
{
    gl_Position = mvp * vertexIn;
    color = vec4(colorIn; 1.0);
}
```
~ VTX(2)

FIG. 8A

```
varying lowp vec4 color;
varying lowp vec4 fogColor;

void main()
{
    gl_FragColor = color + fogColor;
}
```
← FRG(1)

FIG. 8B

```
varying lowp vec3 color;
uniform lowp float fColor;

void main()
{
    gl_FragColor = vec4(color.xyz, 1.0) + vec4(vec3(fColor), 0.0);
}
```
← FRG(2)

FIG. 9A

```
attribute vec4 vertexIn;
attribute vec4 colorIn;

uniform lowp float alpha;
uniform lowp vec3 fColor;
uniform highp mat4 mvp;

varying lowp vec4 color;
varying lowp vec4 fogColor;
varying lowp float cParam;

void main()
{
    gl_Position = mvp * vertexIn;

cParam = colorIn * fColor.w * alpha;
    color = vec4(colorIn.xyz, cParam);
    fogColor = vec4(fColor.xyz * cParam, alpha);
}
```
⎯ VTX(3)

FIG. 9B

```
attribute vec4 vertexIn;
attribute vec4 colorIn;

uniform lowp float alpha;
uniform highp mat4 mvp;

varying lowp vec4 color;

void main()
{
    gl_Position = mvp * vertexIn;

lowp float cParam = colorIn * fColor.w * alpha;
    color = vec4(colorIn.xyz, cParam);
}
```
~ VTX(4)

FIG. 10A

```
varying lowp vec4 color;
varying lowp vec4 fogColor;
varying lowp float cParam;

void main()
{
    gl_FragColor = color * cParam + fogColor;
}
```
— FRG(3)

FIG. 10B

```
varying lowp vec4 color;

uniform lowp float alpha;
uniform lowp vec3 fColor;

void main()
{
    lowp float cParam = color.w;
    lowp vec4 fogColor = vec4(fColor.xyz * cParam, alpha);
    gl_FragColor = color * cParam + fogColor;
}
```
— FRG(4)

COMPILER FOR ELIMINATING TARGET VARIABLES TO BE PROCESSED BY THE PRE-PROCESSING CORE

PRIORITY

This application claims priority under 35 USC § 119(a) to a Korean Patent Application filed on Dec. 18, 2014 in the Korean Intellectual Property Office and assigned Serial No. 10-2014-0183062, the entire contents of which are incorporated herein by reference.

BACKGROUND

1. Field of the Disclosure

The present disclosure relates generally to a compiling technique, and more particularly, to a compiler that converts a source program (or, source code) into an object program (or object code).

2. Description of the Related Art

Recently, a shader programming language is widely used to program (or code) a programmable rendering pipeline of a Graphics Processing Unit (GPU) in computer graphics fields. The programmable rendering pipeline (e.g., referred to as a GPU architecture) includes a plurality of programmable cores (e.g., a vertex shader, a rasterizer, a fragment shader, raster operations, etc). However, since a shader program (i.e., a program that is coded using a shader programming language) is usually programmed without regard to hardware, duplicate values or constant values are frequently applied to variables (i.e., referred to as varying variables). That is, data channels of the varying variables are unnecessarily formed among the programmable cores. Thus, increased power consumption and/or performance degradation of the graphics processing unit are caused as the varying variables are unnecessarily stored and loaded in the programmable cores.

SUMMARY

An aspect of the present is to provide a compiler is provided that is capable of reducing power consumption and/or performance degradation of a graphics processing unit that are caused as variables are unnecessarily stored and loaded in programmable cores (e.g., shaders) by eliminating data channels of the variables, which are unnecessarily formed among the cores when compiling a shader program that is coded using a shader programming language.

Another aspect of the present disclosure is to provide a method of compiling a shader program that is coded using a shader programming language capable of reducing power consumption and/or performance degradation of a graphics processing unit that are caused as variables are unnecessarily stored and loaded in programmable cores by eliminating data channels of the variables, which are unnecessarily formed among the programmable cores when compiling the shader program.

In accordance with an aspect of the present disclosure, a computer system for compiling a source program into an object program is provided. The computer system includes means for converting the source program into an intermediate program, means for generating a modified-intermediate program from the intermediate program by eliminating a target varying variable among varying variables included in the intermediate program from a pre-processing programmable core and by allowing a post-processing programmable core to directly process the target varying variable, and means for converting the modified-intermediate program into the object program.

In accordance with another aspect of the present disclosure, a computer system for compiling a source program into an object program is provided. The computer system includes a graphics processor having a pre-processing core and a post-processing core, and a processor configured to execute a compiler to convert the source program into an intermediate program including a target variable to be processed by the pre-processing core, generate a modified-intermediate program from the intermediate program by eliminating the target variable among variables included in the intermediate program and convert the modified-intermediate program into the object program including the target variable to be processed by the post-processing core.

In accordance with another aspect of the present disclosure, a computer implemented method for compiling a source program into an object program is provided. The computer implemented method includes converting the source program into an intermediate program; generating a modified-intermediate program from the intermediate program by eliminating a target varying variable among varying variables included in the intermediate program from a pre-processing programmable core and by allowing a post-processing programmable core to directly process the target varying variable; and converting the modified-intermediate program into the object program.

In accordance with another aspect of the present disclosure, a computer implemented method for compiling a source program into an object program is provided. The computer implemented method includes converting the source program into an intermediate program and generating the intermediate program from the source program by eliminating a target varying variable among varying variables included in the source program from a pre-processing programmable core and by allowing a post-processing programmable core to directly process the target varying variable; and converting the intermediate program into the object program.

In accordance with another aspect of the present disclosure, an application processor of a terminal is provided. The application processor configured to convert, by a front-end block of a compiler, a source program into an intermediate program; generate, by a program modification block of the compiler, a modified-intermediate program from the intermediate program by eliminating a target varying variable among varying variables included in the intermediate program from a pre-processing programmable core and by allowing a post-processing programmable core to directly process the target varying variable; and convert, by a back-end block of the compiler, the modified-intermediate program into an object program.

In accordance with another aspect of the present disclosure, an application processor is provided. The application processor is configured to convert, by a front-end block of a compiler, a source program into an intermediate program and generate the intermediate program from the source program by eliminating a target varying variable among varying variables included in the source program from a pre-processing programmable core and by allowing a post-processing programmable core to directly process the target varying variable; and convert, by a back-end block of the compiler, the intermediate program into an object program.

In accordance with another aspect of the present disclosure, a computing apparatus is provided. The computing apparatus includes a host processor; a graphics subsystem, including a plurality of programmable cores compiled to eliminate data channels of varying variables that are unnecessarily formed among the programmable cores by eliminating a varying variable of which a value is constant, a varying variable of which a value is equal to a value of another varying variable, and/or a varying variable that is calculated by applying another varying variable to a function that ensures consistency in an intermediate programmable core from a pre-processing programmable core and by allowing a post-processing programmable core to directly process the eliminated varying variable; a memory; and a display.

BRIEF DESCRIPTION OF THE DRAWINGS

The above and other aspects, features, and advantages of the present disclosure will be more apparent from the following detailed description, taken in conjunction with the accompanying drawings, in which:

FIGS. 7A and 7B are diagrams illustrating a vertex shader that is modified by the compiler of FIG. 1;

FIGS. 8A and 8B are diagrams illustrating a fragment shader that is modified by the compiler of FIG. 1;

FIGS. 9A and 9B are diagrams illustrating a vertex shader that is modified by the compiler of FIG. 1;

FIGS. 10A and 10B are diagrams illustrating a fragment shader that is modified by the compiler of FIG. 1;

DETAILED DESCRIPTION OF EMBODIMENTS OF THE PRESENT DISCLOSURE

Figure 1:
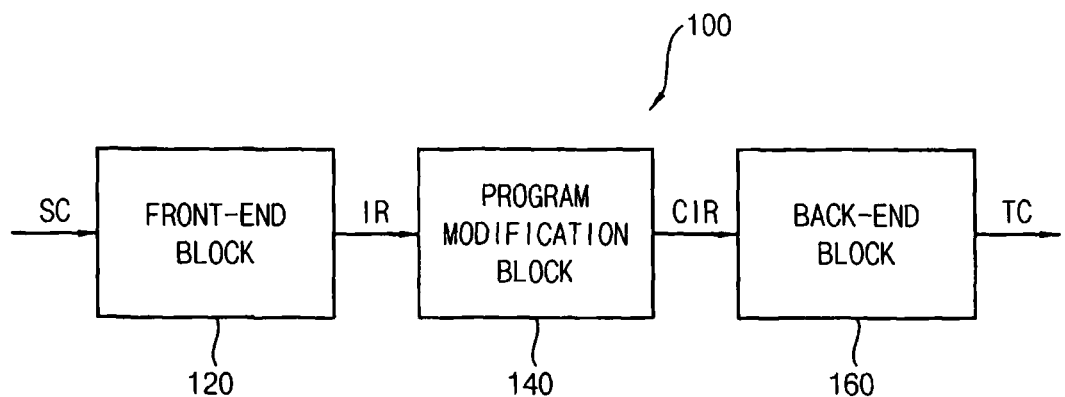
FIG. 1 is a block diagram of a compiler according to an embodiment of the present disclosure.

Various example embodiments of the present disclosure are described more fully below with reference to the accompanying drawings, in which some example embodiments of the present disclosure are shown. The present inventive concept may, however, be embodied in many different forms and should not be construed as being limited to the embodiments set forth herein. Rather, these embodiments are provided so that the present disclosure is thorough and complete, and fully conveys the scope of the present inventive concept to those skilled in the art. Like reference numerals refer to like elements throughout the present disclosure.

It will be understood that, although the terms first, second, etc. may be used herein to describe various elements, these elements should not be limited by these terms. These terms are used to merely distinguish one element from another. For example, a first element could be termed a second element, and, similarly, a second element could be termed a first element, without departing from the scope and spirit of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing certain embodiments of the present disclosure and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

In embodiments of the inventive concepts, "varying variable" may be one of variables used in a graphic library such as Open Graphic Library (OpenGL). The application program interface may be processed by at least one functional block in a Graphic Processor Unit (GPU). The GPU may have one or more functional blocks such as a vertex shader, a rasterizer, a fragment shader and a unit for raster operations. In OpenGL, a varying variable may be a variable which is transmitted from the vetex shader to the fragment shader in the GPU. In other words, the vertex shader may generate an output variable and the fragment shader may receive the output variable as an input variable of the fragment shader.

The one or more functional blocks may be implemented as a programmable core such a Streaming Multiprocessor (SM) or a Scalar/Vector Processor of the GPU. The GPU may perform a parallel processing of data and/or instruction received from a memory.

Figure 2:
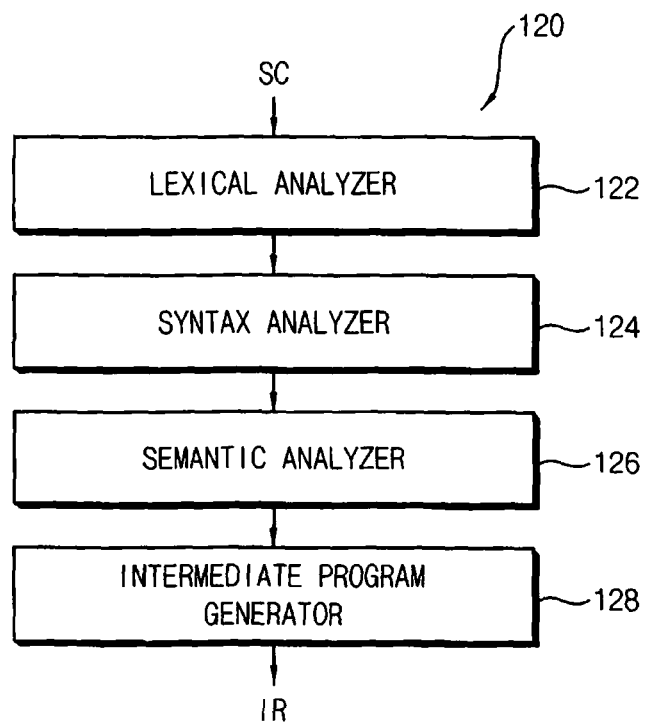
FIG. 2 is a block diagram of a front-end block included in the compiler of FIG. 1.
Figure 3:
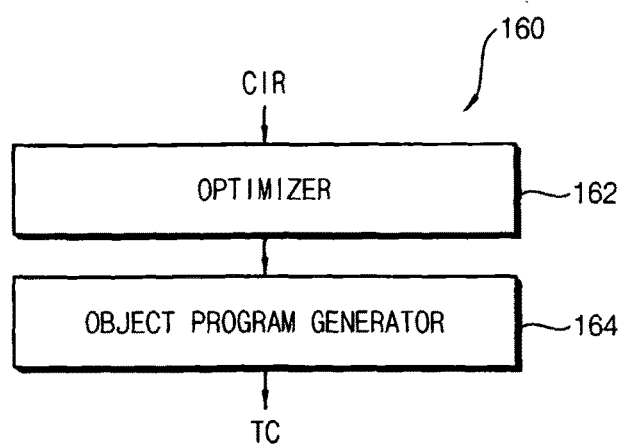
FIG. 3 is a block diagram of a back-end block included in the compiler of FIG. 1.
Figure 4:
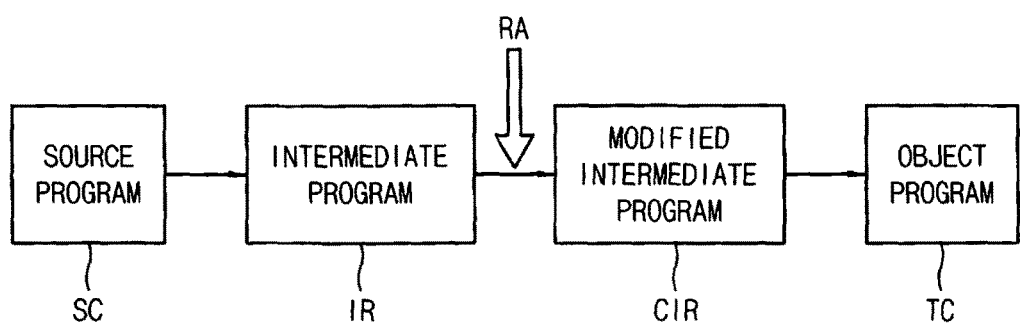
FIG. 4 is a block diagram in which a source program that is converted into an object program by the compiler of FIG. 1.

FIG. 1 is a block diagram of a compiler 100 according to an embodiment of the present disclosure. FIG. 2 is a block diagram of a front-end block 120 included in the compiler of FIG. 1. FIG. 3 is a block diagram of a back-end block 160 included in the compiler of FIG. 1. FIG. 4 is a block diagram in which a source program is converted into an object program by the compiler of FIG. 1.

Referring to FIGS. 1 through 4, the compiler 100 converts a source program SC (or, source code) into an object program TC (or, object code). For this operation, the compiler 100 includes a front-end block 120, a program modification block 140, and a back-end block 160. Although it is illustrated in FIG. 1 that the program modification block 140 is located external to the front-end block 120 and the back-end block 160, in an embodiment of the present disclosure, the program modification block 140 may be located internal to the front-end block 120 or the back-end block 160.

The front-end block 120 converts the source program SC into an intermediate program IR. In this case, the intermediate program IR may be an internal program for converting the source program SC into the object program TC. In an embodiment of the present disclosure, a format of the intermediate program IR may be the same as a format of the source program SC. In an embodiment of the present disclosure, the format of the intermediate program IR may be different from the format of the source program SC. In an embodiment of the present disclosure, the source program SC may be a shader program of a Graphics Processing Unit (GPU) that includes a vertex shader, a rasterizer, a fragment shader, and raster operations. In this case, the front-end block 120 receives the source program SC that is coded (or, programmed) using a shader programming language and generates the intermediate program IR, which is to be converted into the object program TC, based on the source program SC. For this operation, as illustrated in FIG. 2, the front-end block 120 includes a lexical analyzer 122, a syntax analyzer 124, a semantic analyzer 126, and an intermediate program generator 128. The lexical analyzer 122 receives the source program SC externally (i.e., from external components) and generates tokens by performing a lexical analysis on the source program SC. In an embodiment of the present disclosure, the lexical analyzer 122 checks whether a lexical error exists in the source program SC when performing the lexical analysis on the source program SC. The syntax analyzer 124 receives the tokens from the lexical analyzer 122 and generates a syntax structure by performing a syntax analysis and parsing the tokens. In an embodiment of the present disclosure, the syntax analyzer 124 checks whether a syntax error exists in the source program SC when performing the syntax analysis and parsing the tokens. The semantic analyzer 126 receives the syntax structure from the syntax analyzer 124 and performs a semantic analysis on the syntax structure. The intermediate program generator 128 generates the intermediate program IR from the source program SC based on the semantic analysis.

The program modification block 140 receives the intermediate program IR from the front-end block 120 and generates a modified-intermediate program CIR by modifying the intermediate program IR. In this case, the program modification block 140 generates the modified-intermediate program CIR by eliminating a target varying variable among varying variables included in the intermediate program IR from a pre-processing programmable core and by allowing a post-processing programmable core to directly process the target varying variable. In other words, the pre-processing programmable core may skip processing an output variable which is identified as a target variable by the program modification block 140 and the post processing programmable core may process the identified target variable without receiving the output variable as an input variable of the post processing. For example, when the source program SC is a shader program of the graphics processing unit including the vertex shader, the rasterizer, the fragment shader, and the raster operations, the pre-processing programmable core may be the vertex shader, and the post-processing programmable core may be the fragment shader.

In an embodiment of the present disclosure, the program modification block 140 determines a varying variable as the target varying variable when a value of the varying variable is constant (i.e., the varying variable has a value that does not vary) in the pre-processing programmable core and the post-processing programmable core. In an embodiment of the present disclosure, the program modification block 140 determines a varying variable as the target varying variable when a value of the varying variable is the same as a value of another varying variable (i.e., is a duplicate) in the pre-processing programmable core and the post-processing programmable core. In an embodiment of the present disclosure, the program modification block 140 determines a varying variable as the target varying variable when the varying variable is calculated by applying another varying variable to an identity function or a linear function corresponding to an intermediate programmable core that is located between the pre-processing programmable core and the post-processing programmable core. For example, when the source program SC is the shader program of the graphics processing unit including the vertex shader, the rasterizer, the fragment shader, and the raster operations, the intermediate programmable core may be the rasterizer. In an embodiment of the present disclosure, the program modification block 140 eliminates the target varying variable from the pre-processing programmable core and allows the post-processing programmable core to directly process the target varying variable only when an estimated processing time of the post-processing programmable core is reduced as the post-processing programmable core directly processes the target varying variable. That is, when the estimated processing time of the post-processing programmable core is not reduced although the post-processing programmable core directly processes the target varying variable, the program modification block 140 does not modify the intermediate program IR because generating the modified-intermediate program CIR is not beneficial.

The back-end block 160 converts the modified-intermediate program CIR into the object program TC. That is, the back-end block 160 receives the modified-intermediate program CIR from the program modification block 140 and generates the object program TC based on the modified-intermediate program CIR. For this operation, as illustrated in FIG. 3, the back-end block 160 includes an optimizer 162 and an object program generator 164. The optimizer 162 generates an optimized modified-intermediate program by optimizing the modified-intermediate program CIR received from the program modification block 140. That is, the optimizer 162 shortens an execution time of the object program TC and reduces a memory space for storing the object program TC by improving the efficiency of a part of the modified-intermediate program CIR. The object program generator 164 generates the object program TC based on the optimized modified-intermediate program received from the optimizer 162. Subsequently, an execution file generator (e.g., a linker, etc.) generates an execution file, which can be executed by a graphics processing unit, based on the object program TC output from the compiler 100. In an embodiment of the present disclosure, as illustrated in FIG. 1, the program modification block 140 may be located external to the front-end block 120 and the back-end block 160. In this case, the program modification block 140 is coupled between the intermediate program generator 128 of the front-end block 120 and the optimizer 162 of the back-end block 160. In an embodiment of the present disclosure, the program modification block 140 may be located internal to the front-end block 120. In this case, the program modification block 140 is combined with the intermediate program generator 128 of the front-end block 120. Thus, the program modification block 140 interacts with the intermediate program generator 128. In an embodiment of the present disclosure, the intermediate program generator 128 further performs a function of the program modification block 140. In an embodiment of the present disclosure, the program modification block 140 may be located internal to the back-end block 160. In this case, the program modification block 140 is combined with the optimizer 162 of the back-end block 160. Thus, the program modification block 140 interacts with the optimizer 162. In an embodiment of the present disclosure, the optimizer 162 further performs a function of the program modification block 140.

As illustrated in FIG. 4, among varying variables included in the intermediate program IR that is converted (or, generated) from the source program SC (i.e., the shader program that is coded using the shader programming language), the compiler 100 searches for a first type of target varying variable of which a value is constant in the pre-processing programmable core and the post-processing programmable core, a second type of target varying variable of which a value is the same as a value of another varying variable in the pre-processing programmable core and the post-processing programmable core, and a third type of target varying variable that is calculated by applying another varying variable to an identity function or a linear function corresponding to the intermediate programmable core that is located between the pre-processing programmable core and the post-processing programmable core. Then, the compiler 100 generates the modified-intermediate program CIR (i.e., indicated as RA) by modifying the intermediate program IR. In this case, the compiler 100 modifies the intermediate program IR by eliminating the first through third types of target varying variables from the pre-processing programmable core and by allowing the post-processing programmable core to directly process the first through third types of target varying variables. Subsequently, the compiler 100 converts the modified-intermediate program CIR into the object program TC. That is, the compiler 100 eliminates data channels of the varying variables that are unnecessarily formed among the programmable cores (e.g., shaders) by eliminating a varying variable (i.e., the first type of target varying variable) of which a value is constant, a varying variable (i.e., the second type of target varying variable) of which a value is the same as a value of another varying variable, and/or a varying variable (i.e., the third type of target varying variable) that is calculated by applying another varying variable to a function that ensures consistency (e.g., an identity function or a linear function) in the intermediate programmable core (e.g., rasterizer) from the pre-processing programmable core (e.g., the vertex shader) and by allowing the post-processing programmable core (e.g., the fragment shader) to directly process the eliminated varying variables when converting (i.e., compiling) the source program SC into the object program TC. In other words, the pre-processing programmable core may skip processing an output variable which is identified as a target variable by the compiler 100 and the post processing programmable core may process the identified target variable without receiving the output variable as an input variable of the post processing. As a result, the compiler 100 reduces power consumption and/or performance degradation of the graphics processing unit that is caused when varying variables are unnecessarily stored and loaded in the programmable cores.

Figure 5:
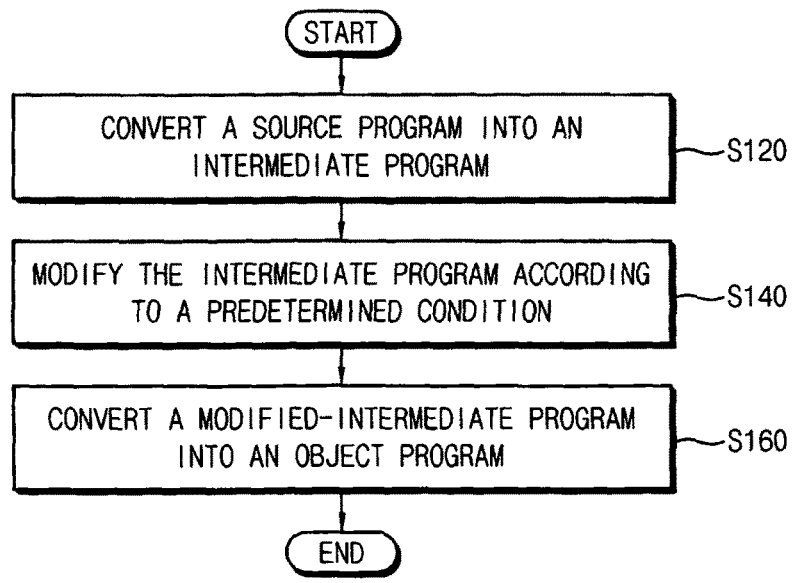
FIG. 5 is a flowchart of a method in which a shader program is compiled by the compiler of FIG. 1.
Figure 6:
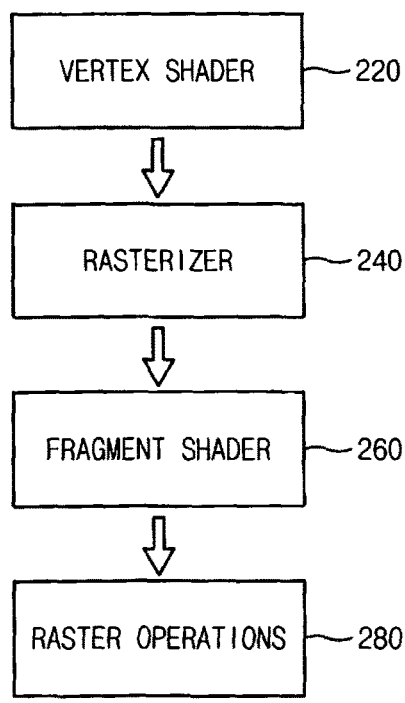
FIG. 6 is a block diagram of a shader program that is compiled by the compiler of FIG. 1.

FIG. 5 is a flowchart of a method in which a shader program is compiled by the compiler of FIG. 1. FIG. 6 is a block diagram of a shader program that is compiled by the compiler of FIG. 1.

Referring to FIGS. 5 and 6, the compiler 100 converts the source program SC into the intermediate program IR in step S120, generates the modified-intermediate program CIR by modifying the intermediate program IR according to a predetermined condition in step S140, and converts the modified-intermediate program CIR into the object program TC in step S160. In this case, the predetermined condition may include a condition in which a varying variable (i.e., the first type of target varying variable) of which a value is constant in the pre-processing programmable core and the post-processing programmable core exists, a condition in which a varying variable (i.e., the second type of target varying variable) of which a value is the same as a value of another varying variable in the pre-processing programmable core and the post-processing programmable core exists, and/or a condition in which a varying variable (i.e., the third type of target varying variable) that is calculated by applying another varying variable to the identity function or the linear function corresponding to the intermediate programmable core that is located between the pre-processing programmable core and the post-processing programmable core. In an embodiment of the present disclosure, the predetermined condition further includes a condition in which an estimated processing time of the post-processing programmable core is reduced as the post-processing programmable core directly processes the first through third types of target varying variables.

In an embodiment of the present disclosure, as illustrated in FIG. 6, a source program SC that is compiled by the compiler 100 of FIG. 1 is a shader program of a graphics processing unit that includes a vertex shader 220, a rasterizer 240, a fragment shader 260, and raster operations 280. In this case, the vertex shader 220 converts vertex data based on vertex data received externally, where the converted vertex data is to be applied to screen-coordinates. The rasterizer 240 generates primitives (e.g., a line, a point, a triangle, etc.) based on the converted vertex data received from the vertex shader 220. The fragment shader 260 generates pixel data by performing an operation such as an interpolation, etc. on the primitives received from the rasterizer 240. The raster operations 280 generate a raster image (e.g., a pixel, a dot, etc.) by performing an operation such as a depth test, color blending, etc. on the pixel data received from the fragment shader 260. As described above, the compiler 100 may eliminate a varying variable (i.e., the first type of target varying variable) of which a value is constant, a varying variable (i.e., the second type of target varying variable) of which a value is the same as a value of another varying variable, and/or a varying variable (i.e., the third type of target varying variable) that is calculated by applying another varying variable to a function that ensures consistency (i.e., the function may be interpreted as an equation that ensures linearity) in the intermediate programmable core from the pre-processing programmable core and may allow the post-processing programmable core to directly process the eliminated varying variables. In this case, the pre-processing programmable core may be the vertex shader 220, the post-processing programmable core may be the fragment shader 260, and the intermediate programmable core may be the rasterizer 240. However, the pre-processing programmable core, the post-processing programmable core, and the intermediate programmable core are not limited thereto.

Generally, a shader programming language is widely used to code a programmable rendering pipeline of a graphics processing unit. The programmable rendering pipeline of the graphics processing unit includes the programmable cores (i.e., the shaders). In addition, each of the programmable cores refers to a set of software instructions. Thus, the programmable cores are used to calculate various rendering effects in a graphics hardware system. In this case, when data channels of the varying variables are reduced in the shaders, power consumption of the graphics processing unit may be reduced and performance of the graphics processing unit may be enhanced. Thus, a technique by which the varying variables are packed has been suggested. However, the technique is not appropriate for recent technique trends such as scalar machine architectures. In addition, packing the varying variables that are set by a programmer has limits. For this reason, the compiler 100 may reduce power consumption and/or performance degradation of the graphics processing unit that are caused by varying variables that are unnecessarily stored and loaded in the programmable cores by reducing the number of varying variables (i.e., reducing the data channels of the varying variables) rather than packing the varying variables. For this operation, when compiling the shader program that is coded using the shader programming language, the compiler 100 eliminates the data channels of the varying variables that are unnecessarily formed among the programmable cores by eliminating a varying variable of which a value is constant, a value is the same as a value of another varying variable, and/or that is calculated by applying another varying variable to a function that ensures consistency in the intermediate programmable core from the pre-processing programmable core (e.g., the vertex shader) and by allowing the post-processing programmable core (e.g., the fragment shader) to directly process the eliminated varying variables. This operation is described below in detail with reference to FIGS. 7A through 10B.

FIGS. 7A and 7B are diagrams illustrating a vertex shader that is modified by the compiler of FIG. 1. FIGS. 8A and 8B are diagrams illustrating a fragment shader that is modified by the compiler of FIG. 1.

Referring to FIGS. 7A through 8B, the vertex shader 220 is modified (i.e., is changed from a first vertex code VTX(1) to a second vertex code VTX(2)) by the compiler 100 and the fragment shader 260 is modified (i.e., is changed from a first fragment code FRG(1) to a second fragment code FRG(2)) by the compiler 100. For convenience of description, it is illustrated in FIGS. 7A through 8B that the vertex shader 220 and the fragment shader 260 are modified on the source program SC instead of the intermediate program IR.

As illustrated in FIG. 7A, an output of the vertex shader 220 includes two "lowp verc4s" (i.e., eight "lowp floats"). In other words, the first vertex code VTX(1) includes two varying variables (i.e., varying variable "lowp vec4 color," varying variable "lowp vec4 fogColor") corresponding to the output of the vertex shader 220. However, since only one "lowp vec3" (i.e., "colorIn") and one "lowp float" (i.e., "fColor") are used in the rasterizer 240, a value of the varying variable (i.e., varying variable "lowp vec4 fog-Color") is constant (i.e., the varying variable is handled as a constant) among two varying variables (i.e., varying variable "lowp vec4 color," varying variable "lowp vec4 fogColor") included in the first vertex code VTX(1) in the pre-processing programmable core (i.e., the vertex shader 220) and the post-processing programmable core (i.e., the fragment shader 260). Thus, the varying variable (i.e., varying variable "lowp vec4 fogColor") is eliminated from the first vertex code VTX(1). In this case, the rasterizer 240 processes four "lowp floats" and the fragment shader 260 loads and processes only four "lowp floats." That is, while the fragment shader 260 loads and processes eight "lowp floats" in the first fragment code FRG(1), the fragment shader 260 loads and processes only four "lowp floats" in the second fragment code FRG(2). In an embodiment of the present disclosure, one "lowp float" that is set as "uniform" (i.e., "fColor") is eliminated from the first vertex code VTX(1) because the "lowp float" that is set as "uniform" (i.e., "fColor") is uniform in all programmable cores. That is, as illustrated in FIG. 7B, the complier 100 changes the vertex shader 220 from the first vertex code VTX(1) to the second vertex code VTX(2) (i.e., modifies the vertex shader 220) by eliminating the varying variable (i.e., varying variable "lowp vec4 fogColor") among the varying variables (i.e., varying variable "lowp vec4 color," "varying variable lowp vec4 fogColor"). Accordingly, as illustrated in FIGS. 8A and 8B, the fragment shader 260 is also modified (i.e., is changed from the first fragment code FRG(1) to the second fragment code FRG(2)) by the complier 100. That is, while two varying variables (i.e., "varying variable lowp vec4 color," "varying variable lowp vec4 fogColor") are loaded and processed in the first fragment code FRG(1), only one varying variable (i.e., varying variable "lowp vec3 color") is loaded and processed in the second fragment code FRG(2). Thus, data channels of varying variables are reduced between the vertex shader 220 and the fragment shader 260. As a result, power consumption of the graphics processing unit is reduced and performance of the graphics processing unit is improved. Since modifications of the vertex shader 220 and the fragment shader 260 illustrated in FIGS. 7A through 8B are examples, the vertex shader 220 and the fragment shader 260 may be modified in various ways.

FIGS. 9A and 9B are diagrams illustrating a vertex shader that is modified by the compiler of FIG. 1. FIGS. 10A and 10B are diagrams illustrating a fragment shader that is modified by the compiler of FIG. 1.

Referring to FIGS. 9A through 10B, the vertex shader 220 is modified (i.e., is changed from a third vertex code VTX(3) to a fourth vertex code VTX(4)) by the compiler 100 and the fragment shader 260 is modified (i.e., is changed from a third fragment code FRG(3) to a fourth fragment code FRG(4)) by the compiler 100. For convenience of description, it is illustrated in FIGS. 9A through 10B that the vertex shader 220 and the fragment shader 260 are modified on the source program SC instead of the intermediate program IR.

As illustrated in FIG. 9A, the third vertex code VTX(3) includes three varyings (i.e., varying "lowp vec4 color," varying "lowp vec4 fogColor," varying "lowp float cParam") corresponding to an output of the vertex shader 220. In this case, as illustrated in FIG. 9B, the varying (i.e., varying "lowp vec4 fogColor") among three varyings (i.e., varying "lowp vec4 color," varying "lowp vec4 fogColor," varying lowp "float cParam") included in the third vertex code VTX(3) may be calculated by applying another varying (i.e., "lowp float cParam"=color.w) to an identity function (i.e., $f(x)=x$) or a linear function (i.e., $f(x)=ax+b$, where a and b are constants) corresponding to the rasterizer 240 that is located between the vertex shader 220 and the fragment shader 260. Thus, the varyings (i.e., varying "lowp vec4 fogColor," varying "lowp float cParam") are eliminated from the third vertex code VTX(3). In other words, the compiler 100 changes the vertex shader 220 from the third vertex code VTX(3) to the fourth vertex code VTX(4) (i.e., modifies the vertex shader 220) by eliminating the varyings (i.e., varying "lowp vec4 fogColor," varying "lowp float cParam") among the varyings (i.e., varying "lowp vec4 color," varying "lowp vec4 fogColor," varying "lowp float cParam"). Accordingly, as illustrated in FIGS. 10A and 10B, the fragment shader 260 is modified (i.e., is changed from the third fragment code FRG(3) to the fourth fragment code FRG(4)) by the complier 100. That is, while three varyings (i.e., varying "lowp vec4 color," varying "lowp vec4 fogColor," varying "lowp float cParam") are loaded and processed in the third fragment code FRG(3), only one varying (i.e., varying "lowp vec4 color") is loaded and processed in the fourth fragment code FRG(4). Thus, data channels of varying variables are reduced between the vertex shader 220 and the fragment shader 260. As a result, power consumption of the graphics processing unit is reduced and performance of the graphics processing unit is improved. Since modifications of the vertex shader 220 and the fragment shader 260 illustrated in FIGS. 10A through 10B are examples, the vertex shader 220 and the fragment shader 260 may be modified in various ways. In an embodiment of the present disclosure, the complier 100 eliminates some of the target varying variables when eliminating data channels of the target varying variables from the pre-processing programmable core (e.g., the vertex shader 220). For example, the compiler 100 determines the number of eliminated target varying variables by considering a load balancing between the pre-processing programmable core (e.g., the vertex shader 220) and the post-processing programmable core (e.g., the fragment shader 260).

Figure 11:
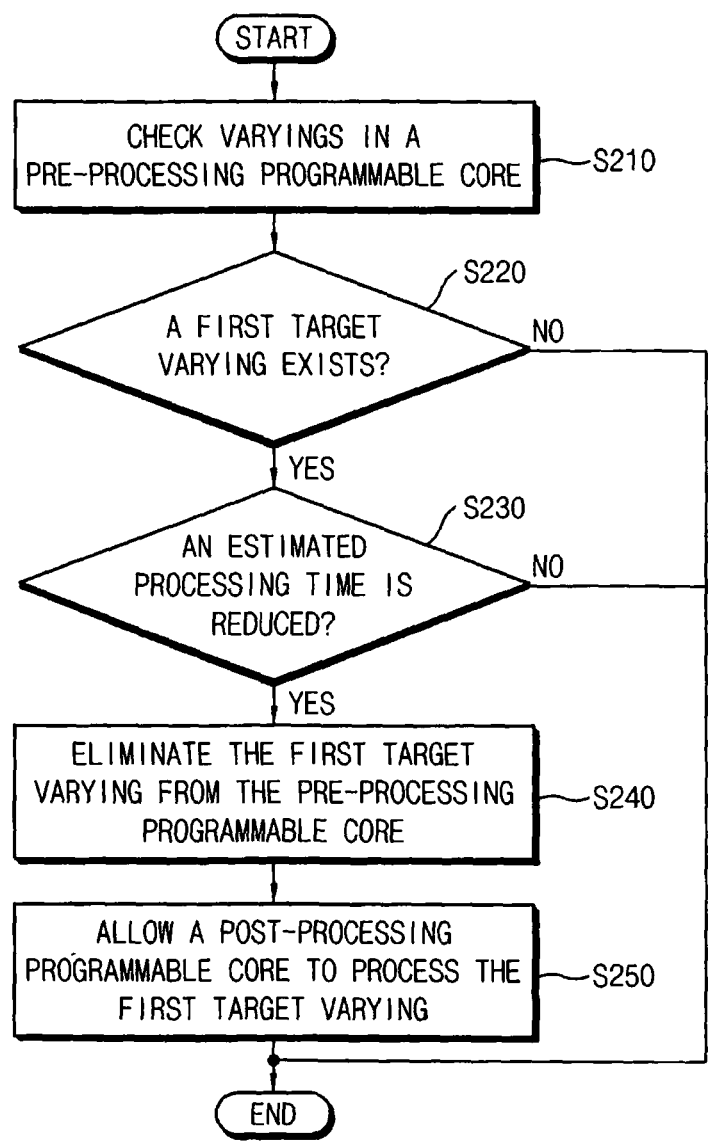
FIG. 11 is a flowchart of a method in which a shader program is compiled by the compiler of FIG. 1.

FIG. 11 is a flowchart of a method in which a shader program is compiled by the compiler of FIG. 1.

Referring to FIG. 11, the complier 100 compiles a source program (e.g., a shader program that is coded using a shader programming language) to generate an object program. Specifically, the compiler 100 checks varying variables (or, variables) in the pre-processing programmable core in step S210 and checks whether a first type of target varying variable of which a value is constant in the pre-processing programmable core (e.g., the vertex shader 220) and the post-processing programmable core (e.g., the fragment shader 260) exists among the varying variables in step S220. In this case, when the first type of target varying variable does not exist among the varying variables, the compiler 100 does not modify the pre-processing programmable core and the post-processing programmable core. In contrast, when the first type of target varying variable exists among the varying variables, the compiler 100 checks whether an estimated processing time of the post-processing programmable core is reduced as the post-processing programmable core processes the first type of target varying variable in step S230. In this case, when the estimated processing time of the post-processing programmable core is not reduced as the post-processing programmable core processes the first target varying variable, the compiler 100 does not modify the pre-processing programmable core and the post-processing programmable core. In contrast, when the estimated processing time of the post-processing programmable core is reduced as the post-processing programmable core processes the first target varying variable, the compiler 100 eliminates the first target varying variable from the pre-processing programmable core in step S240 and allows the post-processing programmable core to process the first target varying variable in step S250. As described above, the compiler 100 modifies the pre-processing programmable core and the post-processing programmable core when the first type of target varying variable exists in the pre-processing programmable core and the estimated processing time of the post-processing programmable core is reduced as the post-processing programmable core processes the first type of target varying variable.

Figure 12:
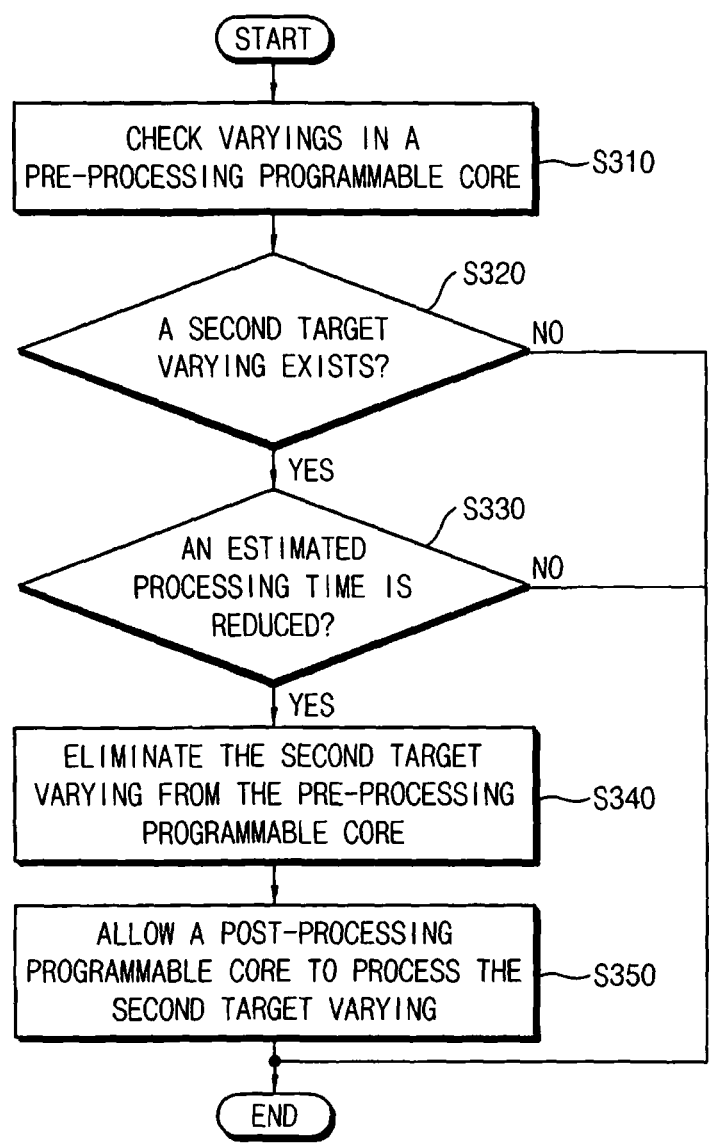
FIG. 12 is a flowchart of a method in which a shader program is compiled by the compiler of FIG. 1.

FIG. 12 is a flowchart of a method in which a shader program is compiled by the compiler of FIG. 1.

Referring to FIG. 12, the complier 100 compiles a source program (e.g., a shader program that is coded using a shader programming language) to generate an object program. Specifically, the compiler 100 checks varying variables in the pre-processing programmable core in step S310 and checks whether a second type of target varying variable of which a value is the same as a value of another varying variable in the pre-processing programmable core (e.g., the vertex shader 220) and the post-processing programmable core (e.g., the fragment shader 260) exists among the varying variables in step S320. In this case, when the second type of target varying variable does not exist among the varying variables, the compiler 100 does not modify the pre-processing programmable core and the post-processing programmable core. In contrast, when the second type of target varying variable exists among the varying variables, the compiler 100 checks whether an estimated processing time of the post-processing programmable core is reduced as the post-processing programmable core processes the second type of target varying variable in step S330. In this case, when the estimated processing time of the post-processing programmable core is not reduced as the post-processing programmable core processes the second type of target varying variable, the compiler 100 does not modify the pre-processing programmable core and the post-processing programmable core. In contrast, when the estimated processing time of the post-processing programmable core is reduced as the post-processing programmable core processes the second type of target varying variable, the compiler 100 eliminates the second type of target varying variable from the pre-processing programmable core in step S340 and allows the post-processing programmable core to process the second type of target varying variable in step S350. As described above, the compiler 100 modifies the pre-processing programmable core and the post-processing programmable core when the second type of target varying variable exists in the pre-processing programmable core and the estimated processing time of the post-processing programmable core is reduced as the post-processing programmable core processes the second type of target varying variable.

Figure 13:
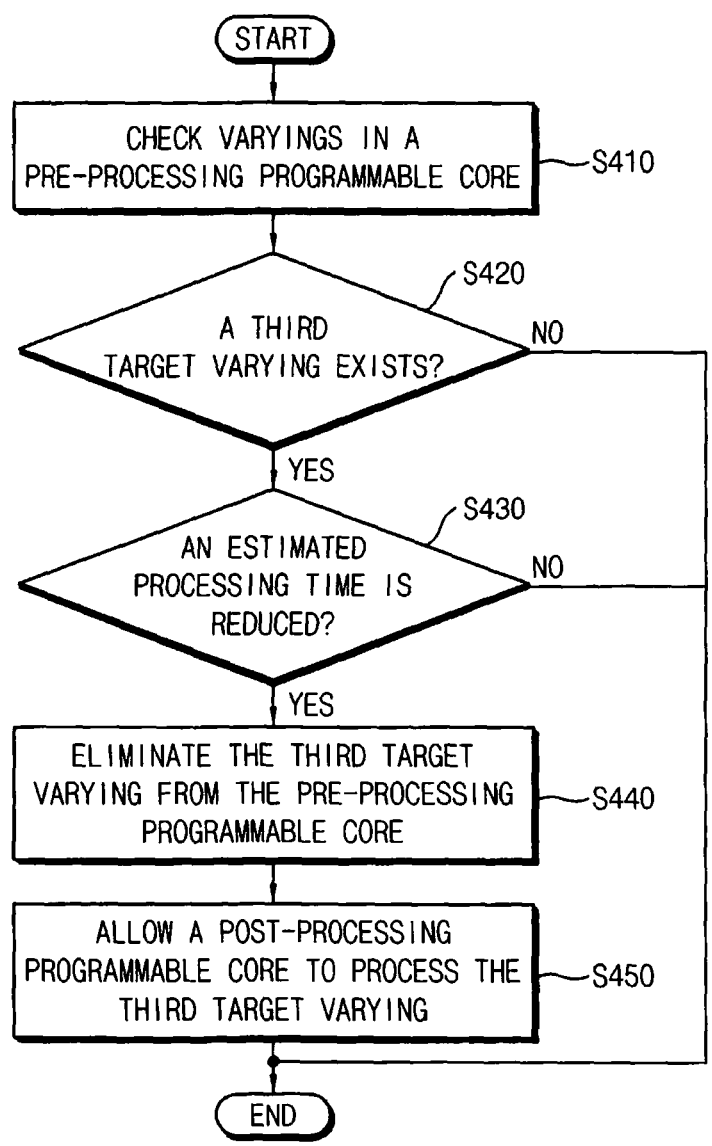
FIG. 13 is a flowchart of a method in which a shader program is compiled by the compiler of FIG. 1.

FIG. 13 is a flowchart of a method in which a shader program is compiled by the compiler of FIG. 1.

Referring to FIG. 13, the complier 100 compiles a source program (e.g., a shader program that is coded using a shader programming language) to generate an object program. Specifically, the compiler 100 checks varying variables in the pre-processing programmable core in step S410 and checks whether a third type of target varying variable that is calculated by applying another varying variable to an identity function or a linear function corresponding to the intermediate programmable core (e.g., the rasterizer 240) that is located between the pre-processing programmable core (e.g., the vertex shader 220) and the post-processing programmable core (e.g., the fragment shader 260) exists among the varying variables in step S420. In this case, when the third type of target varying variable does not exist among the varying variables, the compiler 100 does not modify the pre-processing programmable core and the post-processing programmable core. In contrast, when the third target varying variable exists among the varying variables, the compiler 100 checks whether an estimated processing time of the post-processing programmable core is reduced as the post-processing programmable core processes the third type of target varying variable in step S430. In this case, when the estimated processing time of the post-processing programmable core is not reduced as the post-processing programmable core processes the third type of target varying variable, the compiler 100 does not modify the pre-processing programmable core and the post-processing programmable core. In contrast, when the estimated processing time of the post-processing programmable core is reduced as the post-processing programmable core processes the third type of target varying variable, the compiler 100 eliminates the third type of target varying variable from the pre-processing programmable core in step S440 and may allow the post-processing programmable core to process the third type of target varying variable in step S450. As described above, the compiler 100 modifies the pre-processing programmable core and the post-processing programmable core when the third type of target varying variable exists in the pre-processing programmable core and the estimated processing time of the post-processing programmable core is reduced as the post-processing programmable core processes the third type of target varying variable.

Figure 14:
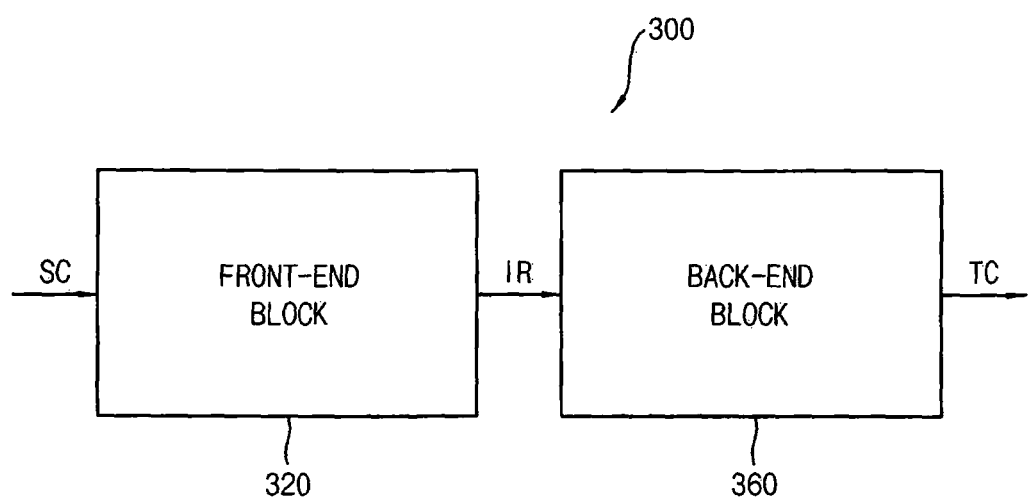
FIG. 14 is a block diagram of a compiler according to an embodiment of the present disclosure.
Figure 15:
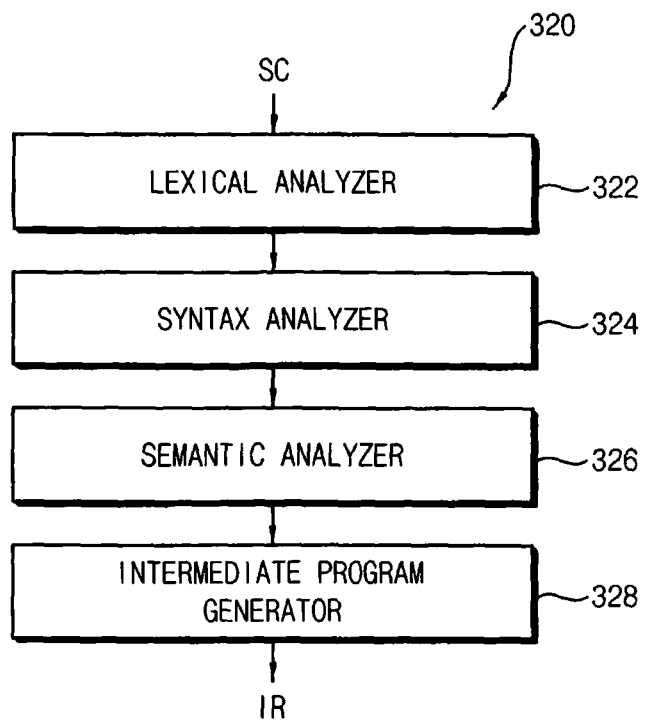
FIG. 15 is a block diagram of a front-end block included in the compiler of FIG. 14.
Figure 16:
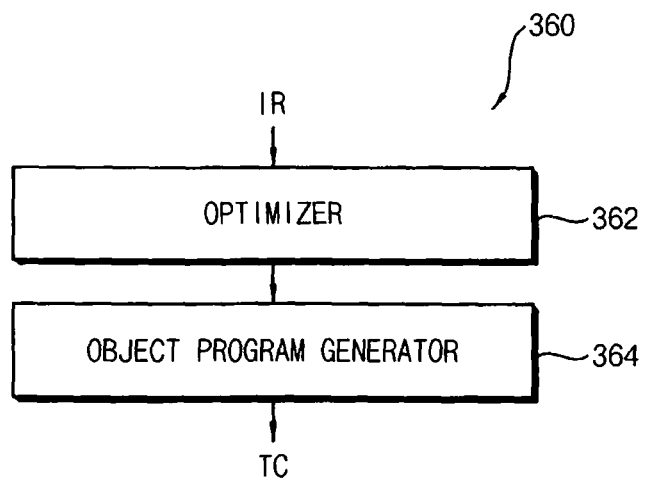
FIG. 16 is a block diagram of a back-end block included in the compiler of FIG. 14.
Figure 17:
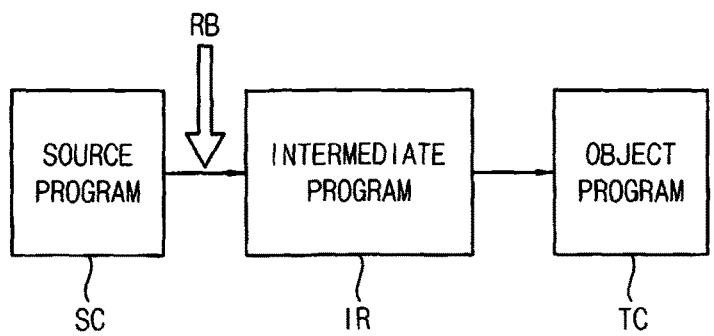
FIG. 17 is a block diagram in which a source program is converted into an object program by the compiler of FIG. 14.

FIG. 14 is a block diagram of a compiler according to an embodiment of the present disclosure. FIG. 15 is a block diagram of a front-end block included in the compiler of FIG. 14. FIG. 16 is a block diagram of a back-end block included in the compiler of FIG. 14. FIG. 17 is a block diagram in which a source program is converted into an object program by the compiler of FIG. 14.

Referring to FIGS. 14 through 17, the compiler 300 converts a source program SC (or, source code) into an object program TC (or, object code). For this operation, the compiler 300 includes a front-end block 320 and a back-end block 360.

The front-end block 320 converts the source program SC into an intermediate program IR. In this case, the intermediate program IR may be an internal program for converting the source program SC into the object program TC. In an embodiment of the present disclosure, a format of the intermediate program IR may be the same as a format of the source program SC. In an embodiment of the present disclosure, the format of the intermediate program IR may be different from the format of the source program SC. In an embodiment of the present disclosure, the source program SC may be a shader program of a graphics processing unit that includes a vertex shader, a rasterizer, a fragment shader, and raster operations. In this case, the front-end block 320 receives the source program SC that is coded (or, programmed) using a shader programming language and generates the intermediate program IR, which is to be converted into the object program TC, based on the source program SC. The front-end block 320 generates the intermediate program IR by eliminating a target varying variable among varying variables included in the source program SC from a pre-processing programmable core and by allowing a post-processing programmable core to directly process the target varying variable. For example, when the source program SC is a shader program of the graphics processing unit including the vertex shader, the rasterizer, the fragment shader, and the raster operations, the pre-processing programmable core may be the vertex shader, and the post-processing programmable core may be the fragment shader. In an embodiment of the present disclosure, the front-end block 320 determines a varying variable as the target varying variable type when a value of the varying variable is constant (i.e., the varying variable has a value that does not change) in the pre-processing programmable core and the post-processing programmable core. In an embodiment of the present disclosure, the front-end block 320 determines a varying variable as the target varying variable type when a value of the varying variable is the same as a value of another varying variable (i.e., a duplicate) in the pre-processing programmable core and the post-processing programmable core. In an embodiment of the present disclosure, the front-end block 320 determines a varying variable as the target varying variable type when the varying variable is calculated by applying another varying variable to an identity function or a linear function corresponding to an intermediate programmable core that is located between the pre-processing programmable core and the post-processing programmable core. For example, when the source program SC is the shader program of the graphics processing unit including the vertex shader, the rasterizer, the fragment shader, and the raster operations, the intermediate programmable core may be the rasterizer. In an embodiment of the present disclosure, the front-end block 320 eliminates the target varying variable type from the pre-processing programmable core and allows the post-processing programmable core to directly process the target varying variable type only when an estimated processing time of the post-processing programmable core is reduced as the post-processing programmable core directly processes the target varying variable type.

For this operation, as illustrated in FIG. 15, the front-end block 320 includes a lexical analyzer 322, a syntax analyzer 324, a semantic analyzer 326, and an intermediate program generator 328. The lexical analyzer 322 receives the source program SC externally (i.e., from external components) and generates tokens by performing a lexical analysis on the source program SC. In an embodiment of the present disclosure, the lexical analyzer 322 checks whether a lexical error exists in the source program SC when performing the lexical analysis on the source program SC. The syntax analyzer 324 receives the tokens from the lexical analyzer 322 and generates a syntax structure by performing a syntax analysis and parsing the tokens. In an embodiment of the present disclosure, the syntax analyzer 324 checks whether a syntax error exists in the source program SC when performing the syntax analysis and parsing the tokens. The semantic analyzer 326 receives the syntax structure from the syntax analyzer 324 and performs a semantic analysis on the syntax structure. The intermediate program generator 328 generates the intermediate program IR from the source program SC based on the semantic analysis. In this case, the intermediate program generator 328 eliminates the target varying variable type from the pre-processing programmable core and allows the post-processing programmable core to directly process the target varying variable type when generating the intermediate program IR. The back-end block 360 converts the intermediate program IR into the object program TC. That is, the back-end block 360 receives the intermediate program IR from the front-end block 320 and generates the object program TC based on the intermediate program IR. For this operation, as illustrated in FIG. 16, the back-end block 360 includes an optimizer 362 and an object program generator 364. The optimizer 362 generates an optimized intermediate program by optimizing the intermediate program IR received from the front-end block 320. That is, the optimizer 362 may shorten an execution time of the object program TC and may reduce a memory space occupied by the object program TC by improving the efficiency of a part of the intermediate program IR. The object program generator 364 generates the object program TC based on the optimized intermediate program received from the optimizer 362. Subsequently, an execution file generator (e.g., a linker, etc) generates an execution file, which can be executed by a graphics processing unit, based on the object program TC output from the compiler 300.

As illustrated in FIG. 17, among varying variables included in the source program SC (i.e., the shader program that is coded using the shader programming language), the compiler 300 may search for a first type of target varying variable of which a value is constant in the pre-processing programmable core and the post-processing programmable core, a second type of target varying variable of which a value is the same as a value of another varying variable in the pre-processing programmable core and the post-processing programmable core, and a third type of target varying variable that is calculated by applying another varying variable to the identity function or the linear function corresponding to the intermediate programmable core that is located between the pre-processing programmable core and the post-processing programmable core. Then, the compiler 300 generates the intermediate program IR (i.e., indicated as RB) by modifying the source program SC. In this case, the compiler 300 modifies the source program SC by eliminating the first through third types of target varying variables from the pre-processing programmable core and allowing the post-processing programmable core to directly process the first through third types of target varying variables. Subsequently, the compiler 300 converts the intermediate program IR into the object program TC. That is, the compiler 300 eliminates data channels of the varying variables that are unnecessarily formed among the programmable cores (e.g., shaders) by eliminating a varying variable (i.e., the first type of target varying variable) of which a value is constant, a varying variable (i.e., the second type of target varying variable) of which a value is the same as a value of another varying variable, and/or a varying variable (i.e., the third type of target varying variable) that is calculated by applying another varying variable to a function that ensures consistency (e.g., an identity function or a linear function) in the intermediate programmable core (e.g., the rasterizer) from the pre-processing programmable core (e.g., the vertex shader) and by allowing the post-processing programmable core (e.g., the fragment shader) to directly process the eliminated varying variables when converting (i.e., compiling) the source program SC into the object program TC. As a result, the compiler 300 reduces power consumption and/or performance degradation of the graphics processing unit that is caused as the varying variables are unnecessarily stored and loaded in the programmable cores.

Figure 18:
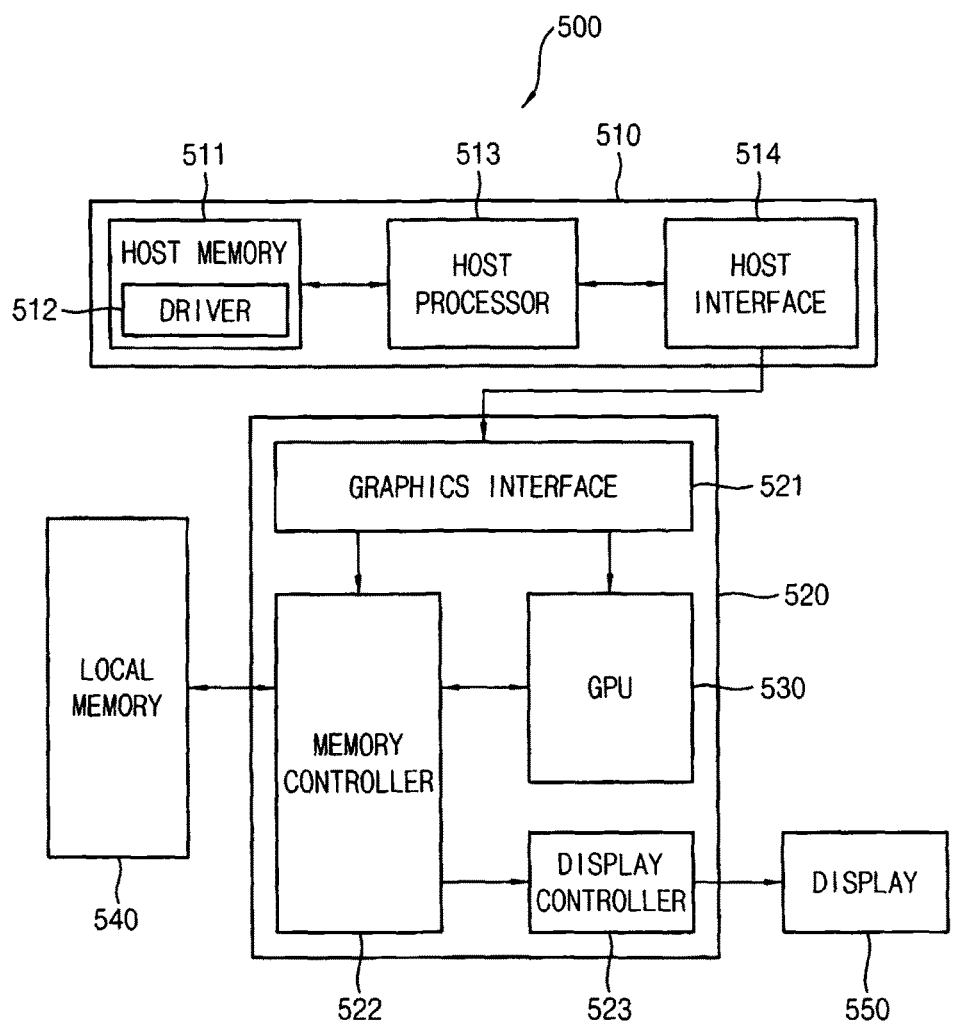
FIG. 18 is a block diagram of a computing system including a graphics processing unit according to an embodiment of the present disclosure.

FIG. 18 is a block diagram of a computing system 500 including a graphics processing unit according to an embodiment of the present disclosure.

Referring to FIG. 18, the computing system 500 includes a host computer 510, a graphics sub system 520, a local memory 540, and a display 550. In this case, the computing system 500 may be implemented as a computer, a workstation, a laptop, a game console, a tablet Personal Computer (PC), a cellular phone, a smart phone, a smart pad, a Personal Digital Assistant (PDA), a Portable Multimedia Player (PMP), etc.

The host computer 510 includes a host memory 511, a host driver 512, a host processor 513, and a host interface 514. The host computer 510 may further include a system memory controller that directly communicates (or, interfaces) with the host memory 511 or communicates with the host memory 511 through the host interface 514. The host interface 514 may be an input/output (I/O) interface. The host driver 512 performs an interfacing operation between the host processor 513 and the graphics sub system 520. The host computer 510 communicates with the graphics sub system 520 through the host interface 514 and the graphics interface 521.

The graphics sub system 520 includes the graphics interface 521, a graphics processing unit (GPU) 530, a memory controller 522, and a display controller 523. The graphics processing unit 530 may include a programmable rendering pipeline that includes a plurality of programmable cores (e.g., a vertex shader, a rasterizer, a fragment shader, raster operations, etc). In this case, a shader program of the graphics processing unit 530 corresponding to the programmable cores may be compiled by a compiler according to an embodiment of the present disclosure.

The host memory 511 may include a fast access memory such as DRAM, MRAM, PRAM, etc. and a relatively slow access memory such as Hard Disk Driver (HDD), Solid State Disk driver (SSD), embedded Multimedia Card (eMMC). The host memory 511 may permanently or temporarily store a compiler described in FIGS. 1 to 17. The host processor 513 may read instructions associated with the compiler and perform the compile operation after reading a source code to generate a object code. The source code may be one of graphic libraries. One or more software modules related to the front-end block 120 and the program modification block 140 and the back-end block 160 illustrated in FIG. 1 may be executed by the central processing unit during the compile operation. The compiled target code may be stored in the system memory while the GPU processes graphic data stored in the local graphics memory 540 in FIG. 18. The processed graphic data may be transferred to the display 740. The compile operation may occurs whenever the computing system 500 starts a software program such as a computer game software or whenever a graphic library is newly compiled to process graphic data for graphic display.

The compiler may eliminate data channels of varying variables that are unnecessarily formed among the programmable cores (e.g., the shaders) by eliminating a varying variable of which a value is constant, a varying variable of which a value is the same as a value of another varying variable, and/or a varying variable that is calculated by applying another varying variable to a function that ensures consistency (e.g., an identity function, a linear function, etc.) in an intermediate programmable core (e.g., the rasterizer) from a pre-processing programmable core (e.g., the vertex shader) and by allowing the post-processing programmable core (e.g., the fragment shader) to directly process the eliminated varying variables when compiling the shader program that is coded using a shader programming language. As a result, the compiler reduces power consumption and/or performance degradation of the graphics processing unit 530 that are caused as the varying variables are unnecessarily stored and loaded in the programmable cores. Since these operations are described above, their descriptions are not repeated here.

The memory controller 522 controls a memory access between the local memory 540 and the graphics processing unit 530. The display controller 523 controls the display 550.

Figure 19:
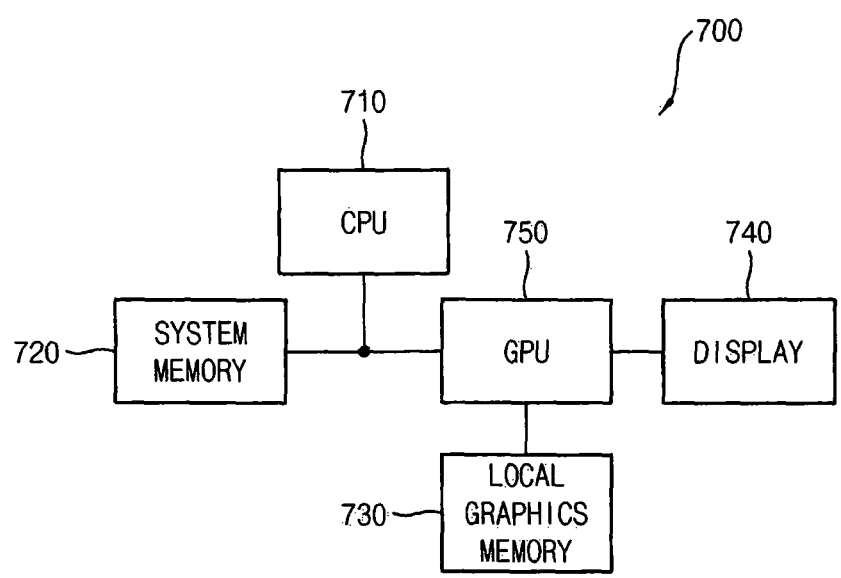
FIG. 19 is a block diagram of a computing system including a graphics processing unit according to an embodiment of the present disclosure.

FIG. 19 is a block diagram of a computing system 700 including a graphics processing unit 750 according to an embodiment of the present disclosure.

Referring to FIG. 19, the computing system 700 includes a Central Processing Unit (CPU) 710, a system memory 720, a local graphics memory 730, a display 740, and the graphics processing unit 750. In this case, the computing system 700 may be implemented as a computer, a workstation, a laptop, a game console, a tablet PC, a cellular phone, a smart phone, a smart pad, a personal digital assistant, a portable multimedia player, etc.

The central processing unit 710 performs various computing functions. The central processing unit 710 controls an overall operation of the computing system 700. For example, the central processing unit 710 may be a processor, a microprocessor, an Application Processor (AP), etc. The central processing unit 710 may be coupled to other components via an address bus, a control bus, a data bus, etc. Further, the central processing unit 710 may be coupled to an extended bus such as a Peripheral Component Interconnection (PCI) bus.

The system memory 720 stores data for an operation of the computing system 700. The local graphics memory 730 stores data for an operation of the graphics processing unit 750. For example, the system memory 720 and/or the local graphics memory 730 may include at least one non-volatile memory device such as an Erasable Programmable Read-Only Memory (EPROM) device, an Electrically Erasable Programmable Read-Only Memory (EEPROM) device, a flash memory device, a Phase change Random Access Memory (PRAM) device, a Resistance Random Access Memory (RRAM) device, a Nano Floating Gate Memory (NFGM) device, a Polymer Random Access Memory (PoRAM) device, a Magnetic Random Access Memory (MRAM) device, a Ferroelectric Random Access Memory (FRAM) device, etc. and/or at least one volatile memory device such as a Dynamic Random Access Memory (DRAM) device, a Static Random Access Memory (SRAM) device, a mobile DRAM device, etc. The system memory 720 may include a fast access memory such as DRAM, MRAM, PRAM, etc. and a relatively slow access memory such as Hard Disk Driver (HDD), Solid State Disk driver (SSD), embedded Multimedia Card (eMMC). The system memory 720 may permanently or temporarily store a compiler described in FIGS. 1 to 17. The central processing unit 710 may read instructions associated with the compiler and perform the compile operation after reading a source code to generate a object code. The source code may be one of graphic libraries. One or more software modules related to the front-end block 120 and the program modification block 140 and the back-end block 160 illustrated in FIG. 1 may be executed by the central processing unit during the compile operation. The compiled target code may be stored in the system memory while the GPU processes graphic data stored in the local graphics memory 730 in FIG. 19. The processed graphic data may be transferred to the display 740. The compile operation may occurs whenever the computing system 500 starts a software program such as a computer game software or whenever a graphic library is newly compiled to process graphic data for graphic display.

The display 740 displays an image generated by the graphics processing unit 750 or by a combination of the graphics processing unit 750 and the central processing unit 710 to provide visual information to a user. For example, the display 740 may include a Liquid Crystal Display (LCD) device, an Organic Light Emitting Diode (OLED) device, etc. The graphics processing unit 750 performs various operations for graphics processing.

In an embodiment of the present disclosure, the graphics processing unit 750 includes a programmable rendering pipeline that includes a plurality of programmable cores (e.g., a vertex shader, a rasterizer, a fragment shader, raster operations, etc). In this case, a shader program of the graphics processing unit 750 corresponding to the programmable cores may be compiled by a compiler according to an embodiment of the present disclosure. The compiler eliminates data channels of varying variables that are unnecessarily formed among the programmable cores (e.g., the shaders) by eliminating a varying variable of which a value is constant, a varying variable of which a value is the same as a value of another varying variable, and/or a varying variable that is calculated by applying another varying variable to a function that ensures consistency (e.g., an identity function, a linear function, etc) in an intermediate programmable core (e.g., the rasterizer) from a pre-processing programmable core (e.g., the vertex shader) and by allowing the post-processing programmable core (e.g., the fragment shader) to directly process the eliminated varying variables when compiling the shader program that is coded using a shader programming language. As a result, the compiler reduces power consumption and/or performance degradation of the graphics processing unit 750 that are caused as the varying variables are unnecessarily stored and loaded in the programmable cores. Since these operations are described above, their descriptions are not repeated here.

In an embodiment of the present disclosure, the computing system 700 includes an input device such as a keyboard, a keypad, a mouse device, a touchpad, a touch-screen, etc. and an output device such as a printer, a speaker, etc. In an embodiment of the present disclosure, the computing system 700 further includes a sensor device such as a gyro sensor module that measures rotating angular speed, an acceleration sensor module that measures speed and momentum, a geomagnetic field sensor module that acts as a compass, a barometric sensor module that measures altitude, a gesture-proximity-illumination sensor module that performs various operations such as motion recognition, proximity detection, illumination measurement, etc, a temperature-humidity sensor module that measures temperature and humidity, and a grip sensor module that determines whether the computing system 700 is gripped by a user. In an embodiment of the present disclosure, the computing system 700 further includes a communication device such as a Code Division Multiple Access (CDMA) module, a Long Term Evolution (LTE) module, a Radio Frequency (RF) module, an Ultra WideBand (UWB) module, a Wireless Local Area Network (WLAN) module, a Worldwide Interoperability for Microwave Access (WIMAX) module, etc. Although various components included in the computing system 700 are mentioned above, components included in the computing system 700 are not limited thereto. For example, the computing system 700 may further include a Global Positioning System (GPS) module, etc.

The present inventive concept may be applied to a graphics processing unit including programmable cores and a computing system including the graphics processing unit. For example, the present inventive concept may be applied to a personal computer, a workstation, a laptop, a game console, a cellular phone, a smart phone, a smart pad, a tablet PC, a personal digital assistant, a portable multimedia player, etc.

The foregoing is illustrative of embodiments of the present disclosure and is not to be construed as limiting thereof.

Although a few example embodiments of the present disclosure have been described, those skilled in the art will readily appreciate that many modifications are possible in the embodiments of the present disclosure without materially departing from the novel teachings and advantages of the present inventive concept. Accordingly, all such modifications are intended to be included within the scope and spirit of the present inventive concept as defined by the appended claims and their equivalents. Therefore, it is to be understood that the foregoing is illustrative of various embodiments of the present disclosure and is not to be construed as limited to the embodiments disclosed, and that modifications to the disclosed embodiments, as well as other embodiments, are intended to be included within the scope of the present disclosure as defined by the appended claims and their equivalents.

What is claimed is:

1. A computer system for compiling a source program into an object program, the computer system comprising:
   a graphics processor having a pre-processing core and a post-processing core; and
   a processor configured to execute a compiler to convert the source program into an intermediate program, to generate a modified-intermediate program from the intermediate program by eliminating a target variable to be processed by the pre-processing core among variables included in the intermediate program and by allowing the post-processing core to directly process the target variable, and to convert the modified-intermediate program into the object program.

2. The computer system of claim 1, wherein the source program is a shader program of the graphics processor including a vertex shader, a rasterizer, a fragment shader, and raster operations, and
   wherein the pre-processing core is the vertex shader, and the post-processing core is the fragment shader.

3. The computer system of claim 1, wherein the processor is further configured to determine a variable as the target variable when a value of the variable is constant in the pre-processing core and the post-processing core.

4. The computer system of claim 1, wherein the processor is further configured to determine a variable as the target variable when a value of the variable is equal to a value of another variable in the pre-processing core and the post-processing core.

5. The computer system of claim 1, wherein the processor is further configured to determine a variable as the target variable when the variable is calculated by applying another variable to an identity function or a linear function corresponding to an intermediate core that is located between the pre-processing core and the post-processing core.

6. The computer system of claim 1, wherein the processor is further configured to eliminate the target variable from the pre-processing core and allow the post-processing core to directly process the target variable when an estimated processing time of the post-processing core is reduced as the post-processing core directly processes the target variable.

7. The computer system of claim 1, wherein the processor is further configured to generate a plurality of tokens by performing a lexical analysis on the source program, generate a syntax structure by performing a syntax analysis and parsing the tokens, perform a semantic analysis on the syntax structure and generate the intermediate program from the source program based on the semantic analysis.

8. The computer system of claim 7, wherein the processor is further configured to generate an optimized modified-intermediate program by optimizing the modified-intermediate program and generate the object program based on the optimized modified-intermediate program.

9. A computer implemented method for compiling a source program into an object program, the computer implemented method comprising:
   converting, by a processor, the source program into an intermediate program;
   generating, by the processor, a modified-intermediate program from the intermediate program by eliminating a target varying variable to be processed by a pre-processing programmable core among varying variables included in the intermediate program and by allowing a post-processing programmable core to directly process the target varying variable; and
   converting, by the processor, the modified-intermediate program into the object program.

10. The computer implemented method of claim 9, wherein the source program is a shader program of a graphics processing unit including a vertex shader, a rasterizer, a fragment shader, and raster operations, and
    wherein the pre-processing core is the vertex shader, and the post-processing core is the fragment shader.

11. The computer implemented method of claim 9, wherein generating the modified-intermediate program from the intermediate program includes:
    determining a varying variable as the target varying variable when a value of the varying variable is constant in the pre-processing programmable core and the post-processing programmable core.

12. The computer implemented method of claim 9, wherein generating the modified-intermediate program from the intermediate program includes:
    determining a varying variable as the target varying variable when a value of the varying variable is equal to a value of another varying variable in the pre-processing programmable core and the post-processing programmable core.

13. The computer implemented method of claim 9, wherein generating the modified-intermediate program from the intermediate program includes:
    determining a varying variable as the target varying variable when the varying variable is calculated by applying another varying variable to an identity function or a linear function corresponding to an intermediate programmable core that is located between the pre-processing programmable core and the post-processing programmable core.

14. The computer implemented method of claim 9, wherein generating the modified-intermediate program from the intermediate program includes:
    eliminating the target varying variable from the pre-processing programmable core and allowing the post-processing programmable core to directly process the target varying variable when an estimated processing time of the post-processing programmable core is reduced as the post-processing programmable core directly processes the target varying variable.

15. An application processor executing a compiler configured to:
    convert, by a front-end block of the compiler, a source program into an intermediate program;
    generate, by a program modification block of the compiler, a modified-intermediate program from the intermediate program by eliminating a target varying variable to be processed by a pre-processing programmable core among varying variables included in the intermediate program and by allowing a post-processing programmable core to directly process the target varying variable; and convert, by a back-end block of the compiler, the modified-intermediate program into an object program.

16. The application processor of claim 15, wherein the source program is a shader program of a graphics processing unit including a vertex shader, a rasterizer, a fragment shader, and raster operations, and wherein the pre-processing programmable core is the vertex shader, and the post-processing programmable core is the fragment shader.

17. The application processor of claim 15, wherein the program modification block determines a varying variable as the target varying variable when a value of the varying variable is constant in the pre-processing core and the post-processing core.

18. The application processor of claim 15, wherein the program modification block determines a varying variable as the target varying variable when a value of the varying variable is equal to a value of another varying variable in the pre-processing programmable core and the post-processing programmable core.

19. The application processor of claim 15, wherein the program modification block determines a varying variable as the target varying variable when the varying variable is calculated by applying another varying variable to an identity function or a linear function corresponding to an intermediate programmable core that is located between the pre-processing programmable core and the post-processing programmable core.

20. The application processor of claim 15, wherein the program modification block eliminates the target varying variable from the pre-processing programmable core and allows the post-processing programmable core to directly process the target varying variable when an estimated processing time of the post-processing programmable core is reduced as the post-processing programmable core directly processes the target varying variable.

* * * * *